(12) United States Patent
Singh et al.

(10) Patent No.: US 11,080,475 B2
(45) Date of Patent: Aug. 3, 2021

(54) PREDICTING SPREADSHEET PROPERTIES

(71) Applicant: Microsoft Technology Licensing, LLC, Redmond, WA (US)

(72) Inventors: Rishabh Singh, Kirkland, WA (US); Ben Livshits, London (GB); Benjamin G. Zorn, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 128 days.

(21) Appl. No.: 15/408,334

(22) Filed: Jan. 17, 2017

(65) Prior Publication Data

US 2018/0203836 A1   Jul. 19, 2018

(51) Int. Cl.
*G06F 40/18* (2020.01)
*G06F 40/30* (2020.01)
*G06N 3/08* (2006.01)
*G06N 3/04* (2006.01)

(52) U.S. Cl.
CPC .............. *G06F 40/18* (2020.01); *G06F 40/30* (2020.01); *G06N 3/04* (2013.01); *G06N 3/08* (2013.01)

(58) Field of Classification Search
CPC .. G06F 17/246; G06F 17/211; G06F 17/2785; G06N 3/04; G06N 3/08
See application file for complete search history.

(56) References Cited

U.S. PATENT DOCUMENTS

| 5,742,835 | A | | 4/1998 | Kaethler |
| 5,842,180 | A | * | 11/1998 | Khanna ............... G06F 3/04895 705/30 |
| 6,640,234 | B1 | | 10/2003 | Coffen et al. |
| 6,948,154 | B1 | * | 9/2005 | Rothermel ............ G06F 17/246 717/128 |
| 7,117,430 | B2 | | 10/2006 | Maguire, III |
| 7,127,672 | B1 | * | 10/2006 | Patterson ............... G06F 17/246 715/220 |

(Continued)

OTHER PUBLICATIONS

Liskov_Data abstraction and hierarchy_pp. 17-34_published Oct. 1987 (Year: 1987).*

(Continued)

*Primary Examiner* — Stephen S Hong
*Assistant Examiner* — Ahamed I Nazar
(74) *Attorney, Agent, or Firm* — Alleman Hall Creasman & Tuttle LLP

(57) ABSTRACT

A device includes a logic machine and a data-holding machine having instructions executable by the logic machine to receive a spreadsheet including a plurality of cells, apply an abstraction to the spreadsheet that defines one or more features of a cell set including one or more cells of the plurality of cells to form an abstracted representation of the spreadsheet, form, for the cell set, an input vector for a machine-learning prediction function from the abstracted representation of the spreadsheet, the machine-learning prediction function configured to output a prediction of one or more properties of the cell set based on the input vector, wherein the machine-learning prediction function is previously trained based on a plurality of previously-created spreadsheets, provide the input vector to the machine-learning prediction function; and output the prediction from the machine-learning prediction function.

20 Claims, 7 Drawing Sheets

(56) References Cited

U.S. PATENT DOCUMENTS

| | | | |
|---|---|---|---|
| 7,136,785 | B2 | 11/2006 | Mast et al. |
| 7,707,486 | B2 | 4/2010 | Genesereth et al. |
| 8,239,380 | B2 | 8/2012 | Brill |
| 8,381,092 | B2 | 2/2013 | Massand |
| 8,621,340 | B2 | 12/2013 | Chirilov et al. |
| 8,812,625 | B1* | 8/2014 | Chitilian ............ H04L 29/08981 709/220 |
| 8,812,947 | B1* | 8/2014 | Maoz .................... G06F 17/246 715/212 |
| 9,032,283 | B2 | 5/2015 | Williamson |
| 9,037,607 | B2 | 5/2015 | Chew |
| 2002/0161799 | A1* | 10/2002 | Maguire, III ........... G06F 40/18 715/212 |
| 2006/0010127 | A1* | 1/2006 | Dettinger ............ G06F 16/2423 |
| 2008/0082463 | A1* | 4/2008 | Cheng .................... G06N 20/00 706/12 |
| 2008/0168341 | A1* | 7/2008 | Payette ................. G06F 17/246 715/212 |
| 2008/0243823 | A1* | 10/2008 | Baris .................... G06F 17/246 |
| 2009/0006382 | A1 | 1/2009 | Tunkelang et al. |
| 2009/0281972 | A1* | 11/2009 | Shahani ................. G06N 20/00 706/14 |
| 2009/0287673 | A1* | 11/2009 | Chronister ........ G06F 17/30994 |
| 2010/0050264 | A1 | 2/2010 | Aebig et al. |
| 2013/0145244 | A1* | 6/2013 | Rothschiller ......... G06F 17/246 715/212 |
| 2013/0346844 | A1* | 12/2013 | Graepel ................ G06F 40/226 715/219 |
| 2014/0358828 | A1* | 12/2014 | Phillipps .............. G06N 99/005 706/12 |
| 2015/0058337 | A1 | 2/2015 | Gordon et al. |
| 2015/0205659 | A1* | 7/2015 | Franklin ................ G06F 17/246 715/212 |
| 2015/0331683 | A1* | 11/2015 | Sevenich ................ G06F 8/443 717/152 |
| 2017/0337238 | A1* | 11/2017 | Zorn .................... G06F 17/3056 |

OTHER PUBLICATIONS

Spreadsheet Advantage—the map tool produces a "map" of a worksheet_p. 1_published 2005 (Year: 2005).*

Powell et al. "An auditing protocol for spreadsheet models", published Mar. 2008, pp. 1-9. (Year: 2008).*

Spreadsheet Advantage, published by spreadsheet advantage.com in 2005, pp. 1-2. (Year: 2005).*

Bradley, Leslie, "Using Bayesian Statistical Methods to Determine the Level of Error in Large Spreadsheets", In Proceedings of 31st International Conference on Software Engineering, May 16, 2009, pp. 351-354.

Bradley, et al., "Error Estimation in Large Spreadsheets using Bayesian Statistics", In Journal of Computing Research Repository, Aug. 2009, pp. 1-12.

Cheung, et al., "CUSTODES: Automatic Spreadsheet Cell Clustering and Smell Detection using Strong and Weak Features", In Proceedings of IEEE/ACM 38th International Conference on Software Engineering, May 14, 2016, pp. 464-475.

U.S. Appl. No. 15/161,119, Zorn, et al., "Statistically Detecting Errors in Spreadsheets", filed May 20, 2016. 56 pages.

* cited by examiner

|   | A | B | C | D | E | F |
|---|---|---|---|---|---|---|
| 1 |   | JULY | AUGUST | SEPTEMBER | OCTOBER | NOVEMBER |
| 2 | NORTH | 4 | 3 | 4 | 2 | 4 |
| 3 | EAST | 7 | 8 | 9 | 5 | 10 |
| 4 | SOUTH | 4 | 5 | 6 | 4 | 7 |
| 5 | WEST | 5 | 6 | 6 | 5 | 7 |
| 6 |   |   |   |   |   |   |
| 7 | TOTAL | 20 | 22 | 26 | 16 | 28 |

FIG. 3

|   | A | B | C | D | E | F |
|---|---|---|---|---|---|---|
| 1 |   | JULY | AUGUST | SEPTEMBER | OCTOBER | NOVEMBER |
| 2 | NORTH | 4 | 3 | 4 | 2 | 4 |
| 3 | EAST | 7 | 8 | 9 | 5 | 10 |
| 4 | SOUTH | 4 | 5 | 6 | 4 | 7 |
| 5 | WEST | 5 | 6 | 6 | 5 | 7 |
| 6 |   |   |   |   |   |   |
| 7 | TOTAL | =SUM(B2:B5) | =SUM(C2:C5) | 26 | =SUM(E2:E5) | =SUM(F2:F5) |

FIG. 4

PREDICTING SPREADSHEET PROPERTIES

BACKGROUND

Spreadsheets provide a mechanism for organizing, calculating, and presenting different types of information. Spreadsheets may be used in a variety of industries. For example, spreadsheets may be used to capture and organize financial, healthcare, education, and other data in a manner that is easy to understand and/or manipulate.

SUMMARY

Examples are disclosed that relate to predicting spreadsheet properties via functions trained by machine learning. One example provides a device including a logic machine and a data-holding machine having instructions executable by the logic machine to receive a spreadsheet including a plurality of cells, and to apply an abstraction to the spreadsheet that defines one or more features of a cell set including one or more cells of the plurality of cells to form an abstracted representation of the spreadsheet. The device is further configured to form, for the cell set, an input vector for a machine-learning prediction function from the abstracted representation of the spreadsheet, the machine-learning prediction function configured to output a prediction of one or more properties of the cell set based on the input vector, wherein the machine-learning prediction function is trained based on a plurality of previously-created spreadsheets. The device is further configured to provide the input vector to the machine-learning prediction function, and output the prediction from the machine-learning prediction function.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF DRAWINGS

FIG. 3 shows an example value view of a spreadsheet.

FIG. 4 shows an example formula view of the spreadsheet of FIG. 3.

DETAILED DESCRIPTION

Figure 1:
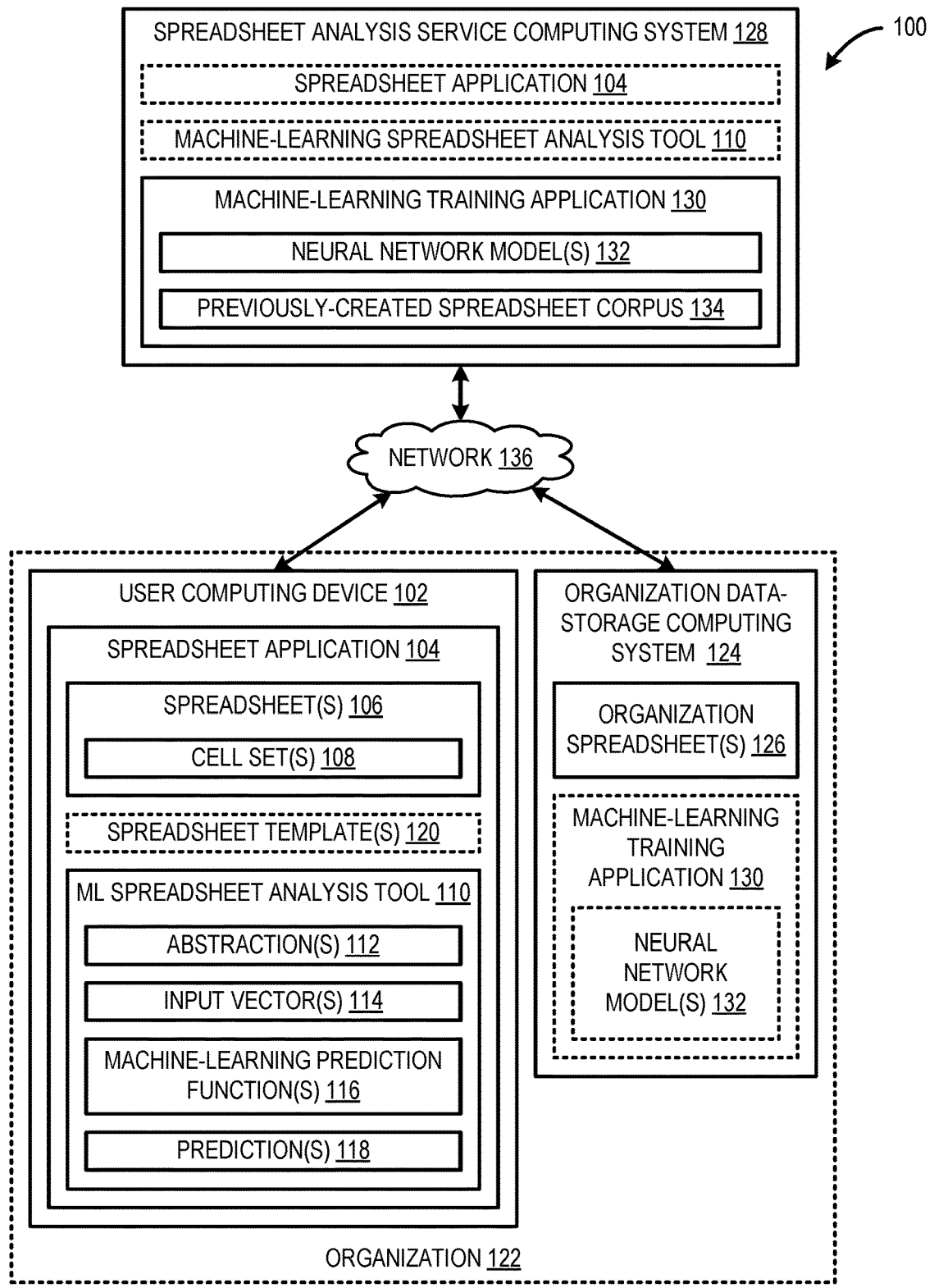
FIG. 1 shows an example computing environment in which one or more properties of a spreadsheet may be predicted by a machine-learning prediction function.

Spreadsheets may include vast amounts of information that may be difficult to manually track and/or audit. Accurate spreadsheets that are free of errors may provide substantial value for an organization by presenting information in an easy to comprehend manner. Likewise, errors in spreadsheets can lead to substantial financial losses for an organization. As such, various analysis tools may be employed to detect different properties of spreadsheets. Some analysis tools may be configured to detect errors in a spreadsheet by applying a fixed set of manually defined rules that check cells of the spreadsheet for common patterns of errors (e.g. to infer types of content in cells of the spreadsheet), and to alert a user of possible errors such as type violations. However, the effectiveness of such analysis tools may be limited by the number and/or type of manually defined rules included in the rule set. Producing a large rule set may allow for more types of errors to be detected, but may be labor-intensive due to the nature of manually defining each rule in the rule set. Moreover, in some cases, a developer of the analysis tool may not recognize some types of errors, and therefore may be unable to manually define rules to detect such errors.

Accordingly, examples are disclosed that relate to approaches for applying machine learning (ML), such as neural networks, to understanding a structure of data and a relationship between code and data in spreadsheets in order to predict properties of the spreadsheets.

As described in more detail below, a machine-learning prediction function may be configured to predict one or more properties of a cell set (e.g., a cell, group of cells, row, column, sheet, and workbook) of a spreadsheet, wherein the machine-learning prediction function is trained based on a plurality of previously-created/existing spreadsheets. To train the function, an abstraction is applied to each of the previously-created spreadsheets to form an abstracted representation of each of the spreadsheets, wherein the abstraction defines one or more features of each cell set of each spreadsheet. A set of training vectors is formed from the abstracted representations of the spreadsheets, wherein each training vector of the training set is formed for a corresponding cell set of each of the previously-created/existing spreadsheets. The set of training vectors is then provided to a neural network model, thereby training the model to produce a prediction function for predicting spreadsheet properties.

Once the machine-learning prediction function is trained, the abstraction is applied to a spreadsheet being analyzed to form an abstracted representation of the spreadsheet. More specifically, an input vector for a cell set of the spreadsheet is formed from the abstracted representation of the spreadsheet, the input vector is provided to the machine-learning prediction function, and a prediction of one or more properties of the cell set is output by the machine-learning prediction function based on the input vector. The machine-learning prediction function may be configured to output predictions for any suitable type of cell set property based on received input vectors. For example, the machine-learning prediction function may be configured to predict whether a cell set includes a potential error, such as the cell set having a type of content that differs from an expected type of content for the cell set.

By training the machine-learning prediction function on previously-created/existing spreadsheets, the machine-learning prediction function is able to understand and identify patterns of structure and/or content that are commonly used in real-world applications. Such a machine-learning approach may allow for different prediction functions to be trained to make predictions about many different kinds of properties of many different kinds of spreadsheets without requiring sets of rules to be manually defined for each different prediction function.

Furthermore, by using a neural network model, training data without predetermined labels can be used to train the machine-learning prediction function. Instead, during the training process, the neural network model can automatically expose suitable labels based on the training data assuming the training data has correct positive examples and positive embedded labels. In such an approach, since less manual effort is required to create labels for different prediction functions than for other machine learning approaches, many different prediction functions can be trained in a labor-efficient and timely manner that allows for rapid empirical exploration to find a highly or most effective prediction function for a particular application. Although a neural network model may be able to create labels for a prediction function, in some implementations, training data for a prediction function may be manually labeled with a ground truth as part of a supervised learning process.

FIG. 1 illustrates an example environment 100 in which machine-learning is applied to predict properties of a spreadsheet. The environment 100 comprises a user device 102 including a spreadsheet application 104 configured to visually present a spreadsheet 106 generated by the spreadsheet application 104. The spreadsheet 106 may include one or more sheets. In examples in which the spreadsheet 106 includes multiples sheets, the spreadsheet 106 may be referred to as a workbook. The spreadsheet 106 includes a plurality of cells that may be grouped into different cell sets, such as cell set 108. The cell set 108 may include any suitable number of cells, such as a single cell or a group of cells, a sheet, and a workbook, as examples. In examples in which the cell set 108 includes multiple cells, the cells of a cell set may be grouped together based on any suitable type of relationship. In one example, multiple cells are grouped together in a cell set based on having a spatial relationship, such as all of the cells being in the same row or column, or forming a matrix around a common cell. In another example, multiple cells are grouped together in a cell set based on having a referential relationship. For example, where a cell includes a formula that references another cell, both cells may be grouped together in a cell set.

In the example of FIG. 1, the spreadsheet application 104 comprises a spreadsheet analysis tool 110 configured to notify a user of potential errors in the spreadsheet 106, for example, by applying machine-learning to analysis of the spreadsheet. The analysis tool 110 is configured to apply an abstraction 112 to the spreadsheet 106, wherein the abstraction 112 defines one or more features of each cell set 108 of the spreadsheet 106. Application of the abstraction 112 to the spreadsheet forms an abstracted representation of the spreadsheet. Any suitable features may be defined by the abstraction 112. For example, the abstraction may include different classes of values (e.g., formula, number, string, empty, boundary, Boolean value, Error value) that can be used to characterize the contents of the different cell sets of the spreadsheet 106. In addition to classes of values, the abstraction may define types of content of the cell sets, spatial features of the cell sets, and referential features of the cell sets. Non-limiting examples of types of content include a numeric value (e.g., an integer, a real number, a decimal number, etc.), a string (e.g., a text string), a formula (e.g., an algorithm, an equation, etc.), a cell format (e.g., a highlighted background color of a cell, a content color (e.g., a color of the numbers and/or text in the cells), hidden content (e.g., whether the content of a cell is hidden from view), and a semantic structure (e.g., "$", "mm/dd/yyyy", "ppl", "lbs", etc.). Non-limiting examples of spatial features include a row, column, neighbor, sheet border position top, bottom, left, right), sheet number. Non-limiting examples of referential features include whether or not a cell set contributes to a formula, whether or not a cell set contains a function that returns a specified value if the formula evaluates to an error, and other forms of dependencies.

In some implementations, the spreadsheet application 104 may include one or more templates 120 that may be used create spreadsheets having a predetermined structure and/or a predefined set of properties. For example, different templates may be used to create different spreadsheets relating to different fields of interest, such as financial, medical, computing, etc. The different templates may include a predetermined set of properties that correspond to the particular field. In some such implementations, the spreadsheet application 104 may be configured to identify a template 120 used to create the spreadsheet 106 and select a template-specific abstraction to apply to the spreadsheet 106 based on the identified template 120. The template-specific abstraction may define particular features that specifically relate to the structure and/or the properties of the particular template. Alternatively or additionally, the spreadsheet application 104 may select a template-specific machine-learning prediction function to apply to the spreadsheet 106 based on the identified template 120. The template-specific machine-learning prediction function may be trained to predict properties that are particular to spreadsheets that are based on the identified template.

In some implementations, the user computing device 102 may be associated with an organization 122. The organization 122 may be any suitable type of organization, such as a workplace (e.g., healthcare company, technology company, and financial institution), school, or community, as examples. The organization 122 may employ organization-specific spreadsheets 126 that have a particular structure and/or a predefined set of properties. Members of the organization 122 may use these organization-specific spreadsheets 126 to organize/present information related to the organization 122. In some cases, the organization-specific spreadsheets 126 may be stored in an organization data-storage computing system 124, such as a secure server and/or database. In some such implementations, the spreadsheet application 104 may be configured to identify an organization associated with the spreadsheet 106, and select an organization-specific abstraction to apply to the spreadsheet 106 based on the identified organization, wherein the organization-specific abstraction may define particular features that specifically relate to the structure and/or the properties of the organization-specific spreadsheet. Alternatively or additionally, the spreadsheet application 104 may select an organization-specific machine-learning prediction function to apply to the spreadsheet 106 based on the identified organization. The organization-specific machine-learning prediction function may be trained to predict properties that are particular to spreadsheets associated with the identified organization.

By applying abstractions that are customized for spreadsheets having specific structures and/or properties, the machine-learning prediction function may be fine-tuned based on those structures and/or properties to make more accurate predictions for those types of spreadsheets.

The analysis tool 110 is further configured to form, for the cell set 108, an input vector 114 for a machine-learning prediction function 116 from the abstracted representation of the spreadsheet 106. The input vector 114 may include a plurality of other cell sets selected from the spreadsheet based on the originating cell set 108 that is used to populate the training vector corresponding to the cell set. For example, such other cell sets may be selected based on an encoding determined for the machine-learning prediction function 116 during training of the machine-learning prediction function 116. As one example, the encoding specifies that the input vector 114 includes a fixed-dimension N×N window of cell sets (e.g., 5×5, 9×9) surrounding the originating cell set 108. In another example, the encoding specifies that the input vector 114 includes a N+N row+column arrangement of cell sets where the input vector 114 includes 2*(N−1) cell sets, and where N is the number of cell sets selected from the same row as the originating cell set 108, and the number of cell sets selected from the same column as the originating cell set 108. These cell sets are described for the purpose of example, and an input vector 114 may be defined as including any other suitable cell sets.

The analysis tool 110 is further configured to provide the input vector 114 to the machine-learning prediction function 116. In turn, the machine-learning prediction function 116 is configured to output a prediction 118 of one or more properties of the cell set 108 based on the input vector 114. In the illustrated example, the machine-learning prediction function 116 is configured to output the prediction 118 of whether the cell set 108 includes a potential error. The predicted error may represent any suitable type of error, such as the cell set 108 having a type of content that differs from an expected type of content for the cell set 108.

In some implementations, where the abstraction 112 defines a plurality of content classes, the machine-learning prediction function 116 may be configured to output a prediction 118 that includes a probability distribution that the content of the cell set 108 corresponds to each content class of the plurality of content classes. Further, in some such implementations, the analysis tool 110 may be configured to identify an error based on the probability distribution (e.g., when a probability of the distribution exceeds a threshold value of a class that differs from an expected class).

The machine-learning prediction function 116 may be configured to make predictions for any suitable property of the cell set 108. In some implementations, the machine-learning prediction function 116 may be configured to make predictions related to the existence of content (e.g., whether a cell is filled or empty), a type of content (e.g., a numeric value, a text string, a formula, etc.), a specific range of values, a most significant digit (e.g., a specific digit), a semantic unit, a semantic structure, a length of content (e.g., a number of characters, a number of digits in a numeric value, a number of letters in a string of text, etc.), a cell format (e.g., a specific highlight color, a specific color of content, whether or not content is hidden from view, etc.), use of an operation in a formula (e.g., an addition operation, a subtraction operation, a multiplication operation, and/or a division operation), and/or Boolean values.

The analysis tool 110 is further configured to output the prediction 118 provided by the machine-learning prediction function 116. The prediction 118 may be output in any suitable manner. As one example, the analysis tool 110 is configured to present, via a display of the user computing device 102, a visual representation indicating the prediction 118 of the one or more properties of the cell set 108 on the spreadsheet 106. As another example, the analysis tool 110 is configured to output a list of cell sets of the spreadsheet 106 that have potential errors as predicted by the machine-learning prediction function 116. The analysis tool 110 may be configured to visually present the list via the display of the user computing device 102 and/or store the list in a file on a storage device of the user computing device 102. In yet another example, the analysis tool 110 may store the list in the organization data-storage computing system 124 along with other lists of errors found in other organization-specific spreadsheets. Such lists may be further analyzed by the analysis tool 110 to find ways to eliminate the errors from occurring in newly-created/future spreadsheets.

In some implementations, the analysis tool 110 may include a plurality of different machine-learning prediction functions that are configured to make predictions for different properties and/or that are used on different types of spreadsheets. In some implementations, the plurality of different machine-learning prediction functions may be trained on different sets of previously-created spreadsheets (e.g., organization-specific spreadsheets, template-specific spreadsheets). In some implementations, the analysis tool 110 may include a hierarchy of machine-learning prediction functions in which the output of one function is provided as input to another function.

A spreadsheet analysis service computing system 128 is configured to communicate with the user device 102 via a network 136. The network 136 can comprise a wide area network (WAN), a local area network (LAN), a personal area network (PAN), a network specific to a datacenter (e.g., an Intranet, a storage area network (SAN)), a mobile telephone network (MTN), etc. The network 136 can also comprise switches that connect various devices to routers and/or other devices that can act as bridges between data networks.

The spreadsheet analysis service computing system 128 includes a machine-learning training application 130 that is configured to train a neural network model 132 to produce the machine-learning prediction function 116 based on a corpus 134 of previously-created spreadsheets. The corpus 134 may include any suitable number and/or type of previously-created spreadsheets. In one example, the corpus 134 includes a wide variety of previously-created spreadsheets that are publicly available. In this scenario, the resulting machine-learning prediction function may be able to provide predictions for a variety of different spreadsheets. In another example, the corpus 134 includes organization-specific spreadsheets 126 that may not be publicly available. In this scenario, the resulting machine-learning prediction function may be fine-tuned to make predictions for organization-specific spreadsheets.

An example neural network model 132 that may be trained by the machine-learning training application 130 to produce the machine-learning prediction function 116 is described in further detail below with reference to FIG. 2. The machine-learning training application 130 may train any suitable type of machine-learning model to produce the machine-learning prediction function 116. Non-limiting examples of machine-learning models that may produce the machine-learning prediction function 116 include Feedforward Networks, Recurrent Neural Network (RNN), Long short-term Memory (LTSM), Convolutional neural network, Support-vector machines (SVM), and Decision Trees. In examples where a neural network model is trained to produce the prediction function, each machine-learning model may have any suitable number of different parameters, such as a different number of hidden layers and a different number of units in each layer.

In some implementations, the spreadsheet application 104 and/or the machine-learning analysis tool 110 may be implemented remotely via the spreadsheet analysis service computing system 128. The spreadsheet analysis service computing system 128 may be any entity or platform that facilitates creation of spreadsheets, storage of spreadsheets, and/or predictions of properties of spreadsheets (e.g., error detection in spreadsheets). The spreadsheet analysis service computing system 128 can be implemented as a non-distributed computing system or can be implemented as a distributed computing system.

In some implementations where the machine-learning prediction function 116 is specifically produced from a corpus of organization-specific spreadsheets, such as organization spreadsheets 126, the machine-learning training application 130 optionally may be executed on the organization data-storage computing system 124. In such implementations, the machine-learning training application 130 may train the neural network model 132 to produce the machine-learning prediction function 116 using the organization spreadsheets 126 without the organization spreadsheets 126 having to be moved from the secure confines of the organization data-storage computing system 124. Accordingly, the organization spreadsheets 126 may remain secure while being used to produce the machine-learning prediction function 116.

In some implementations, the organization spreadsheets 126 may be stored remotely. For example, the organization spreadsheets 126 may be stored in a secure cloud computing system that is remote from the user computing device 102. Further, in some such implementations, the machine-learning training application 130 also may be executed by the secure cloud computing system.

Figure 2:
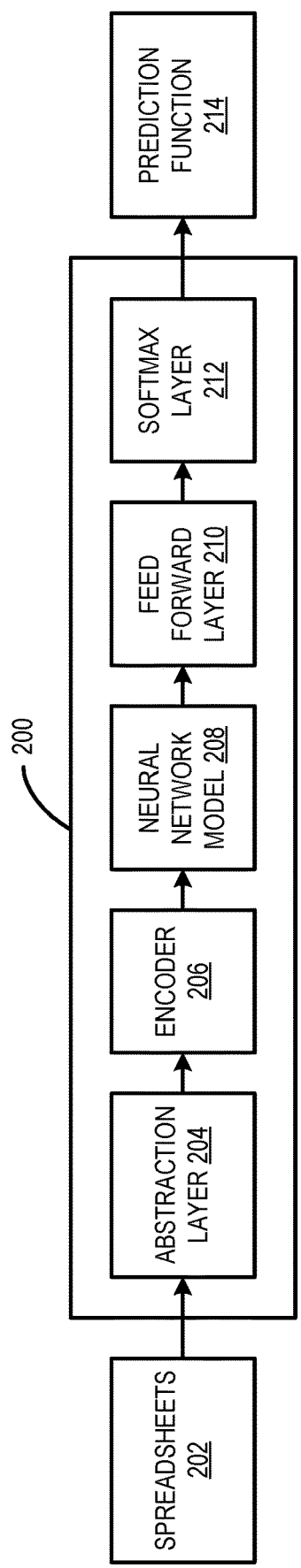
FIG. 2 shows an example architecture for training a machine-learning prediction function.

FIG. 2 shows an architecture 200 for training a machine-learning prediction function. The architecture 200 may be employed by the machine-learning training application 130 to train the machine-learning prediction function 118 of FIG. 1, for example. The architecture 200 is configured to receive a plurality of spreadsheets 202 as input. The architecture 200 is further configured to output a prediction function 214 that is trained based on the plurality of spreadsheets 202. The architecture 200 may include an abstraction layer 204, an encoder 206, a neural network model 208, a feed forward layer 210, and a softmax layer 212.

The plurality of spreadsheets 202 are previously created, meaning that various cell sets of each spreadsheet are populated with information and formatted to have a specific structure. Each spreadsheet may include any suitable number of cell sets, wherein each cell set may include one or more cells, rows, columns, sheets, and/or workbooks including a plurality of sheets. The plurality of spreadsheets 202 may include any suitable number and/or type of spreadsheets. In some scenarios, the plurality of spreadsheets may be specific to an organization and/or created from a same template, and thus may include similar structures, features, and/or content.

In some implementations, the plurality of spreadsheets 202 may be labeled for training the machine-learning prediction function. The training labels may be determined for the plurality of spreadsheets 202 in various manners. In one example, the labels are incorporated into spreadsheet data of the plurality of spreadsheets 202, and the architecture 200 infers the labels directly. For example, the machine-learning prediction function may be trained to predict whether or not the content of a cell includes a formula, and the architecture 200 assumes that the plurality of spreadsheets 202 contain all correct positive examples. As such, during the training process, the architecture 200 can infer which cells contain formulas directly from the spreadsheet data, and label such cells appropriately. Such a labeling approach may be performed in an unsupervised manner that assumes only positive examples are present in the plurality of spreadsheets 202. Optionally, the architecture 200 may be configured to apply labels corresponding to negative examples in the plurality of spreadsheets 202 for training purposes. However, the plurality of spreadsheets 202 would require metadata indicating where errors are present in the spreadsheets. In another example, labels that are separate from the plurality of spreadsheets 202 may be provided as input to the architecture 200. For example, the labels may indicate which cells of a particular spreadsheet are expected to include formulas.

The plurality of spreadsheets 202 may be received as input by the abstraction layer 204. The abstraction layer 204 is configured to, for each spreadsheet of the plurality of spreadsheets, apply an abstraction to the spreadsheet. The abstraction defines one or more features of each cell set of the spreadsheet to form an abstracted representation of the spreadsheet. The abstracted representation of the spreadsheet may retain the visual and spatial aspects of the spreadsheet while exposing features of the cell sets via recognition/classification. Any suitable abstraction can be applied to the plurality of spreadsheets by the abstraction layer 204. In one example, the abstraction includes a plurality of different classes representing different types of contents of the cell sets, and the abstraction layer 204 may apply one or more classes to each cell set.

The abstracted representation of each of the plurality of spreadsheets is input to the encoder 206. The encoder 206 is tasked with providing an amount of context for each cell set in order to predict the features of the cell set. In particular, the encoder 206 is configured to form a set of training vectors for the neural network model 208 from the abstracted representation of each spreadsheet of the plurality of previously-created spreadsheets, wherein a training vector is formed for each cell set of each previously-created spreadsheet. A training vector may include one or more cell sets having any suitable relationship with the originating cell set for populating the training vector. For example, the relationship may be spatial or referential. In one example, the encoding specifies that the input vector includes a fixed-dimension N×N window of cell sets (e.g., 5×5, 9×9) surrounding the originating cell set. In another example, the encoding specifies that the input vector includes an N+N row+column arrangement of cell sets, where the input vector includes $2*(N-1)$ cell sets. In this example, the input vector includes N number of cell sets selected from the same row as the originating cell set and N number of cell sets selected from the same column as the originating cell set.

The set of training vectors for each spreadsheet of the plurality of spreadsheets 202 is input to the neural network model 208. The neural network model 208 is configured to process the set of training vectors to train the neural network model 208 to produce the prediction function 214. In one example, the set of training vectors pass through the layers of the neural network model 208, and the hidden layer representation is propagated to the Feedforward layer 210. The neural network model 208 may have any suitable number of parameters, such as a number of hidden layers and a number of units in each layer used to train the prediction function 214 based on the set of training vectors. In one example, the neural network model 208 includes 128 hidden units in each layer. Likewise, the neural network model may comprise from 1-4 hidden layers in some examples.

The Feedforward layer 210 includes a plurality of layers of computational units. In one example, each layer includes a set of artificial neurons, which use a non-linear function to be activated (1) or not activated (0). The plurality of layers are connected with weighted edges that allow for the Feedforward layer 210 to learn the non-linear function.

The softmax layer 212 is configured to, for each cell set, obtain a probability distribution over the classes of the abstraction applied to each cell set of the spreadsheets. The probability distribution of the training vector may be compared with correctly classified training vectors. On the basis of this comparison, connection weights between the different units/layers of the Feedforward layer 210 may be modified, such that the next time this same pattern is presented at the inputs, the value of the output unit that corresponds with the correct category is increased based on an underlying assumption that a "correct" result is used during training. This training process may be repeated for each training vector to train the prediction function 214.

When all cell sets of the plurality of previously-created spreadsheets have been processed by the neural network model 208, the neural network model 208 produces the machine-learning prediction function 214. The machine-learning prediction function 214 may be further used to predict features of cell sets of a spreadsheet.

Although depicted implementation of the architecture 200 includes a neural network model that is trained with previously-created spreadsheets to produce a prediction function, it will be appreciated that any suitable machine-learning approach or combination of approaches may be employed in the architecture 200 to produce the prediction function 214. Non-limiting examples of such machine-learning approaches include a Feedforward, Network, Recurrent Neural Network (RNN), Long Short-Term Memory (LSTM), Convolutional Neural Network, Support-Vector Machines (SVM), and Decision Trees.

Figures 5, 6:
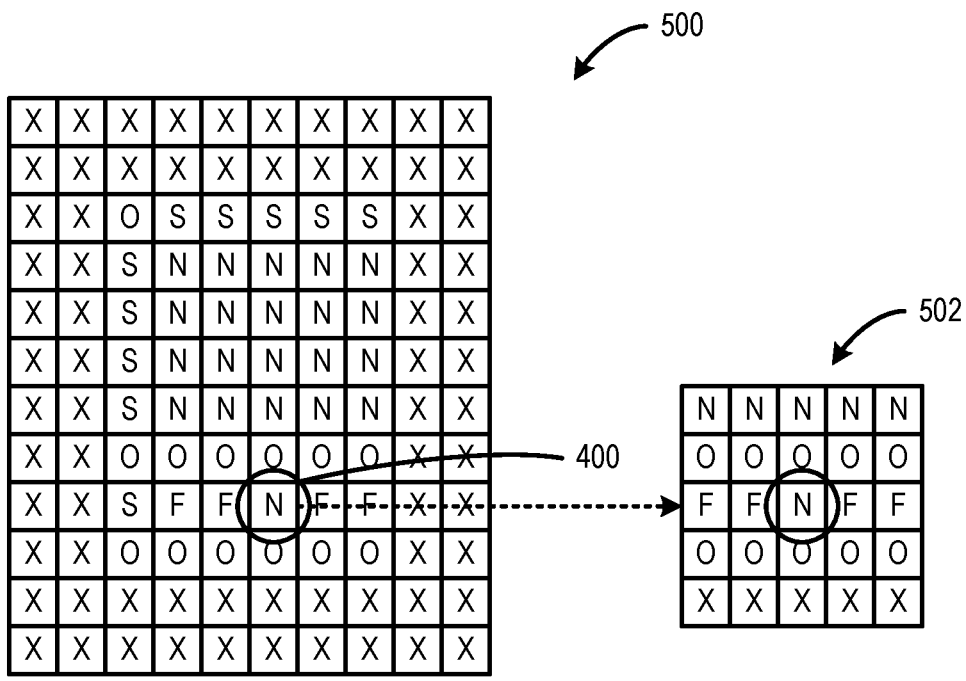
FIG. 5 shows an example abstracted representation of the spreadsheet of FIG. 3.
FIG. 6 shows a view of the spreadsheet of FIG. 3 in which an error identified by a machine-learning prediction function is highlighted with an example visual representation.

FIGS. 3-6 show an example scenario in which an error is detected in a spreadsheet 300 using a machine-learning prediction function, such as the machine learning prediction function 116 of FIG. 1. The different views of the spreadsheet 300 represented in FIGS. 3, 4, and 6 may be visually presented by the spreadsheet application 104 and/or the machine-learning spreadsheet analysis tool 110 of FIG. 1. FIG. 5 shows an abstracted representation of the spreadsheet 300 that is provided for purposes of explanation. However, it will be appreciated that the abstracted representation of the spreadsheet 300 may not be visually presented by the spreadsheet application 104 of FIG. 1. The spreadsheet 300 includes a plurality of cells arranged into rows (e.g., 1-7) 302 and columns (e.g., A-F) 304. The contents of the cells include various text strings, numerical, values, and formulas.

FIG. 3 shows a value view of the spreadsheet 300. In the value view, cells of the spreadsheet 300 that contain formulas are visually presented as containing corresponding numerical values resulting from calculations using the formulas. The value view of the spreadsheet may be considered a "typical" view that is viewed by a user during interaction with the spreadsheet 300.

FIG. 4 shows a formula view of the spreadsheet 300. In the formula view, cells of the spreadsheet 300 that contain formulas are visually presented as containing those formulas. By comparing the value view with the formula view, visual clues about potential anomalies in the contents of the cell may be revealed. In particular, a cell 400 in row 7, column D is shown in the formula view as containing a numerical value when every other cell in that row contains a formula except for the cell that contains a text label. Such a potential error may be identified in an automated fashion by providing the spreadsheet 300 to a machine-learning prediction function that is configured to identify potential errors.

As discussed above, an abstraction may be applied to a spreadsheet to form an abstracted representation of the spreadsheet from which input vectors may be formed and analyzed to identify potential errors in the spreadsheet. FIG. 5 shows an abstracted representation 500 of spreadsheet 300. The abstracted representation 500 may be generated by applying an abstraction to the spreadsheet 300, such as via the machine-learning analysis tool 110 of FIG. 1.

In the depicted example, the abstracted representation 500 is produced by applying an abstraction comprising seven different classes, namely: F {if the cell contains a formula}; N {if the cell contains a number}; S {if the cell contains a string}, O {if the cell is empty}, X {if the cell is at the boundary of the spreadsheet}, B {if the cell contains a Boolean value}; and E {if the cell type has an Error value}. Note that classes B and E are not included in the depicted example. This abstraction is provided as a non-limiting example. It will be appreciated that the abstraction may include any suitable number of different classes. For example, an abstraction may include additional classes or may be more complex in implementations where classification may require reasoning about operators within a formula (e.g., to distinguish between sums and products).

In the abstracted representation 500, the contents of each cell of the spreadsheet 300 is replaced with the symbol associated with the class corresponding to the contents of the cell. Visual inspection of the abstracted representation 500 reveals that the cell 400 potentially includes a potential error due to having a property (e.g., classified as N) that differs from the other cells in the same row of the spreadsheet (e.g., classified as F).

The abstracted representation 500 is encoded to form input vectors that are provided as input to the machine-learning prediction function. As an example, an input vector 502 corresponding to cell 400 is depicted. The cell 400 is an example of a cell set comprising a single cell. The input vector 502 is formed using a 5×5 encoding, although any suitable encoding may be used to form the input vectors. The machine-learning prediction function predicts the contents of each cell based on the input vector. In the illustrated example, the machine-learning prediction function expects cell 400 to be classified in class F based on the contents of the surrounding cells (e.g., the other cells in row 7). Given that the actual contents of the cell 400 is classified in class N, the cell 400 is flagged by the machine-learning prediction function as containing a potential error.

FIG. 6 shows a view of the spreadsheet of FIG. 3 in which the error identified by the machine-learning prediction function is highlighted. In particular, the cell 400 is visually presented with a visual representation that differs from the other cells of the spreadsheet 300 to indicate that the cell 400 includes a potential error.

The scenario depicted in FIGS. 3-6 is provided as an example. It will be appreciated that a potential error and/or another prediction of a property of a cell (or cell set) may be visually presented on the spreadsheet in any suitable manner to bring awareness to the prediction. For example, a prediction of a property may be visually represented via any pattern, color, highlight, or other syntax structure (e.g., bold, italic, underline). Moreover, predicted properties of cell sets may be visually presented in other manners. In one example, the machine-learning prediction function outputs a list of cells containing potential errors. In another example, the machine-learning prediction function outputs a probability distribution of classes for every cell, and cells that differ from an expected class by more than a threshold amount are highlighted.

Figure 7:
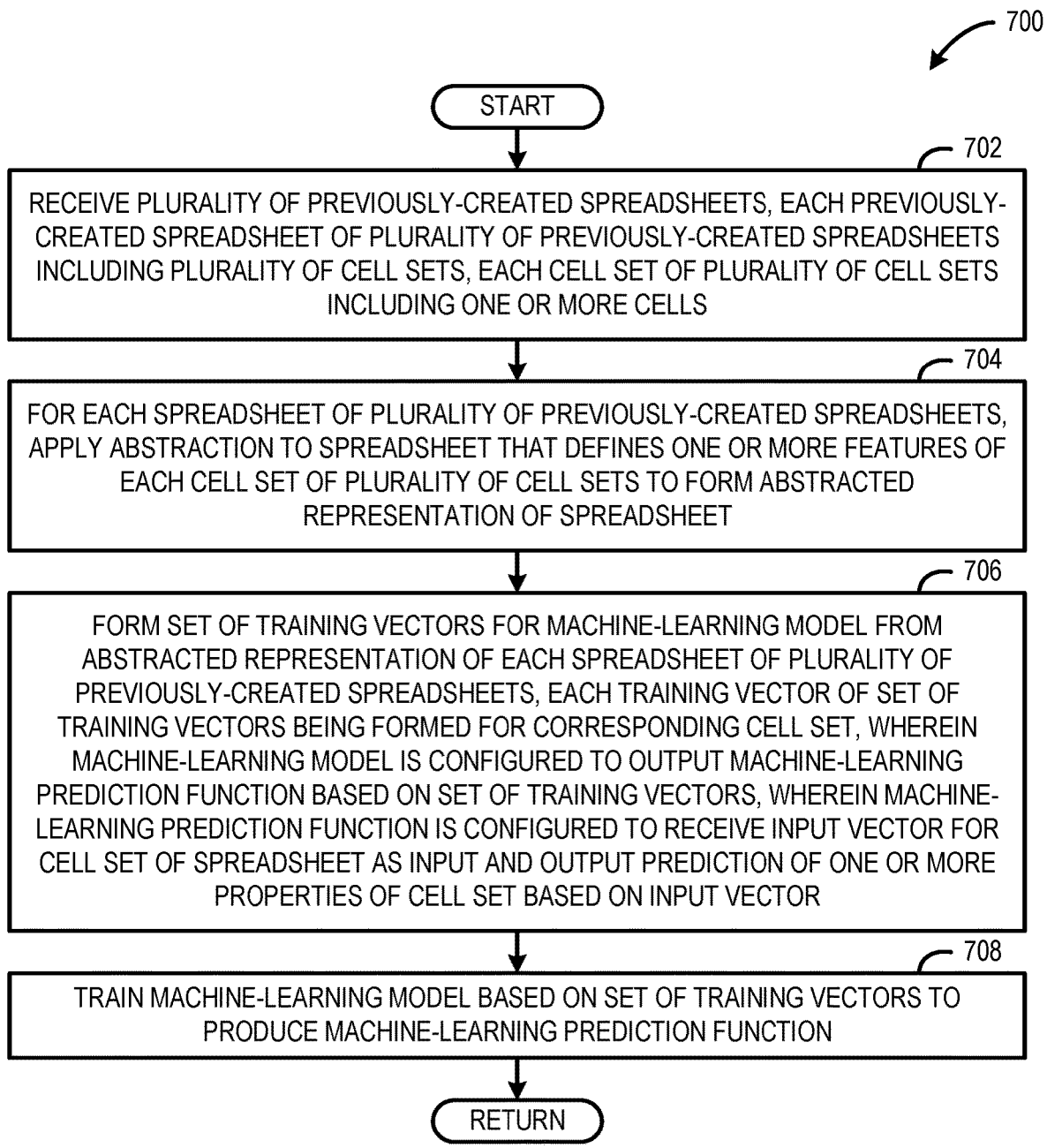
FIG. 7 shows an example method for training a machine-learning model to produce a function for predicting one or more properties of a spreadsheet.

FIG. 7 shows a flow diagram depicting an example method 700 for training a machine-learning model to produce a prediction function for predicting one or more properties of a spreadsheet. For example, the method 700 may be performed by the machine-learning training application 130 of the spreadsheet analysis service computing system 128 of FIG. 1, or by any other suitable computing device. At 702, the method 700 includes receiving a plurality of previously-created spreadsheets. Each previously-created spreadsheet of the plurality of previously-created spreadsheets includes a plurality of cell sets. Each cell set of the plurality of cell sets includes one or more cells. For example, a cell set may include a cell, a group of cells, a row of cells, a column of cells, a sheet of cells, or a workbook including a plurality of sheets of cells. At 704, the method 700 includes, for each spreadsheet of the plurality of previously-created spreadsheets, applying an abstraction to the spreadsheet that defines one or more features of each cell set of the plurality of cell sets to form an abstracted representation of the spreadsheet.

At 706, the method 700 includes forming a set of training vectors for a machine-learning model from the abstracted representation of each spreadsheet of the plurality of previously-created spreadsheets. Each training vector of the set of training vectors corresponds to a cell set of each spreadsheet of the plurality of previously-created spreadsheets. The machine-learning model is trained based on the set of training vectors to produce the machine-learning prediction function. The machine-learning prediction function is configured to receive an input vector for a cell set of a spreadsheet as input and output a prediction of one or more properties of the cell set based on the input vector. The machine-learning model may employ any suitable machine-learning approach. In one example, the machine-learning model is a neural network model. At 708, the method 700 includes training the machine-learning model based on the set of training vectors to produce the machine-learning prediction function.

Figure 8:
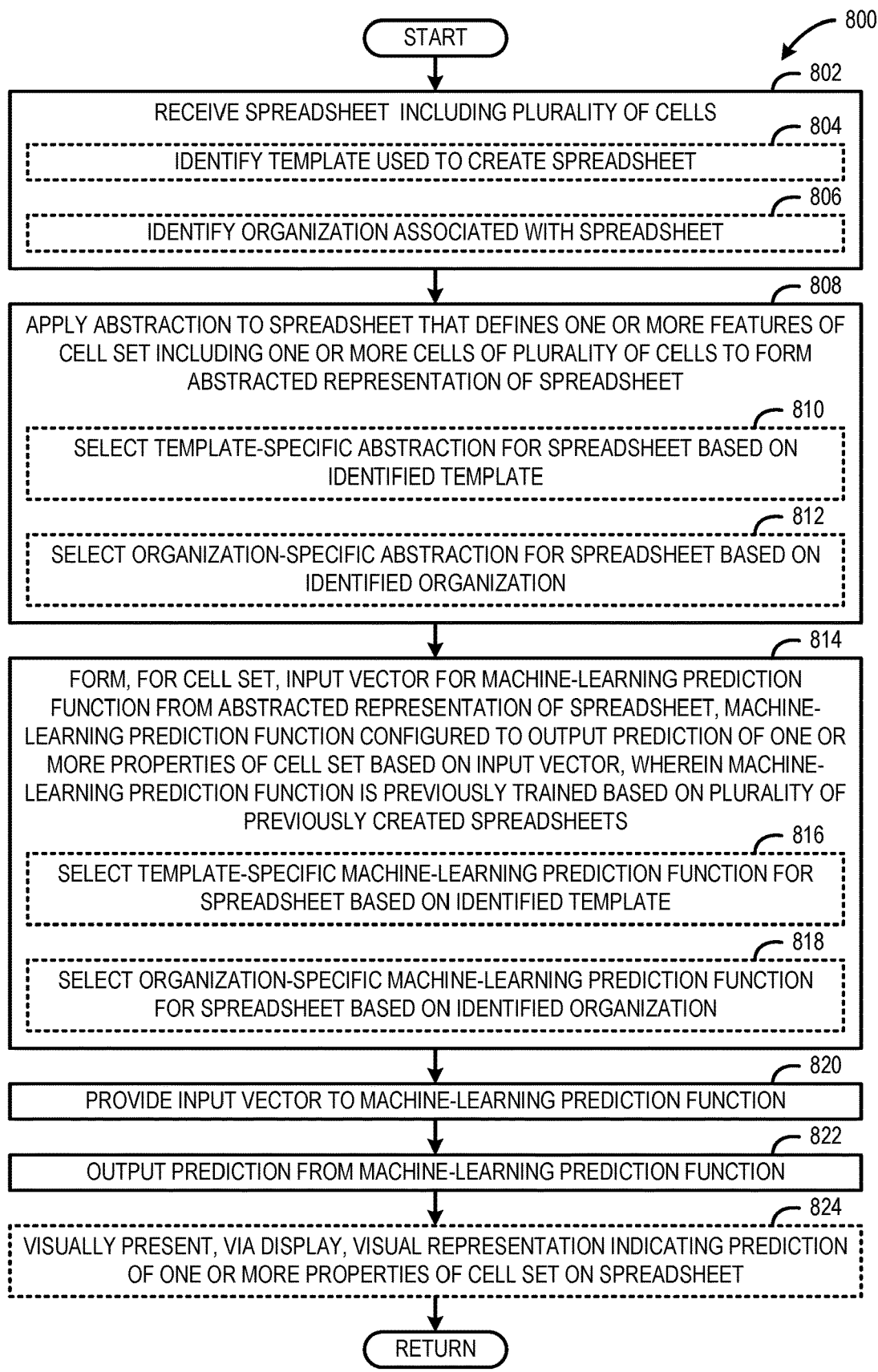
FIG. 8 shows an example method for predicting one or more properties of a spreadsheet using a machine-learning prediction function.

FIG. 8 shows a method 800 for predicting one or more properties of a spreadsheet using a machine-learning prediction function. For example, the method 800 may be performed by the machine-learning spreadsheet analysis tool 130 executed by the user computing device 102 of FIG. 1. More generally, the method 800 may be performed by any suitable computing device.

At 802, the method 800 includes receiving a spreadsheet including a plurality of cells. In some implementations, as indicated at 804, the method 800 optionally may include identifying a template used to create the spreadsheet. The template may specify a particular layout/structure/features for the spreadsheet. Likewise, in some implementations, as indicated at 806, the method 800 optionally may include identifying an organization associated with the spreadsheet. Spreadsheets that are associated with the identified organization may share a common layout/structure/features that may differ from other organizations. For example, features of a spreadsheet associated with a financial organization may differ from features of a spreadsheet associated with a healthcare organization.

At 808, the method 800 includes applying an abstraction to the spreadsheet that defines one or more features of a cell set including one or more cells of the plurality of cells to form an abstracted representation of the spreadsheet. In some implementations, at 810, the method 800 optionally may include selecting a template-specific abstraction for the spreadsheet based on the identified template. The template-specific abstraction may be customized to the particular layout/structure/features of the template used to create the spreadsheet. In some implementations, at 812, the method 800 optionally may include selecting an organization-specific abstraction for the spreadsheet based on the identified organization. The organization-specific abstraction may be customized to the particular layout/structure/features of the specific spreadsheet used by the organization.

At 814, the method 800 includes forming, for the cell set, an input vector for a machine-learning prediction function from the abstracted representation of the spreadsheet. The machine-learning prediction function is configured to output a prediction of one or more properties of the cell set based on the input vector. The machine-learning prediction function is previously trained based on a plurality of previously-created spreadsheets. In some implementations, at 816, the method 800 optionally may include selecting a template-specific machine-learning prediction function for the spreadsheet based on the identified template. The template-specific machine-learning prediction function may be trained to predict particular properties of spreadsheets created according to the particular layout/structure/features of the template used to create the spreadsheet. In some implementations, at 818, the method 800 optionally may include selecting an organization-specific machine-learning prediction function for the spreadsheet based on the identified organization. The organization-specific machine-learning prediction function may be trained to predict properties of the particular layout/structure/features of the specific spreadsheet used by the organization.

At 820, the method 800 includes providing the input vector to the machine-learning prediction function. At 822, the method 800 includes outputting the prediction from the machine-learning prediction function.

In some implementations, at 824, the method 800 optionally may include visually presenting, via a display, a visual representation indicating the prediction of the one or more properties of the cell set on the spreadsheet.

The method 800 may be performed repeatedly for different cell sets of the spreadsheet to predict features of the spreadsheet. According to such an approach, different machine-learning prediction functions can be trained to make predictions for many different kinds of properties of many different kinds of spreadsheets without requiring sets of rules to be manually defined for each different prediction function.

Various experimentation was conducted during training and configuring the machine-learning prediction function discussed herein. In one experiment, a neural network prediction function was trained using spreadsheets from the VEnron corpus (http://sccpu2.cse.ust.hk/venron/). The VEnron corpus contains 7,296 workbooks that were made public in the litigation surrounding the Enron Corporation that occurred in the early 2000's. The spreadsheets in the corpus are from a diverse set of sources including financial spreadsheets. The neural network prediction function was trained further using spreadsheets related to clustering research performed on the VEnron corpus for a total of 13,377 spreadsheets. Further still, the neural network prediction function was trained using 17,719 spreadsheets from a private collection of diverse workbooks including 9,512 Excel workbooks for use with the EXCEL spreadsheet program, available from the Microsoft Corporation of Redmond, Wash.

The neural network prediction function was trained to specifically detect number-where-formula-expected (NWFE) errors. As such, the Custodes project (http://sccpu2.cse.ust.hk/custodes/) was used as a comparison benchmark. The Custodes suite contains a collection of 70 Excel workbooks selected from the FUSES spreadsheet corpus which contains 268 different spreadsheets. The Custodes project hand-labeled the cells in the spreadsheets to provide a ground-truth with respect to several different kinds of errors including errors where a formula is expected but a number is present in a cell. During experimentation, the performance of different algorithms on this subset of errors in the Custodes benchmark workbooks was compared. The neural network prediction function detected 1,707 NWFE errors across the 268 sheets. Because this number is so high, the distribution of hand-labeled NWFE errors in the Custodes workbooks was investigated, and it was found that there are several cases where a large fraction of the numbers in the worksheet are considered errors by the Custodes labeling. As a result, the experiment was limited to evaluation on a subset of the Custodes spreadsheets in which the total fraction of cells containing errors is less than ten percent. This filter resulted in the total number of cells with true error being reduced to 474 out of 42,269 cells containing numbers.

In addition to the Custodes dataset, the neural network prediction model evaluated another test dataset obtained from the EUSES collection of 720 financial spreadsheets. This dataset is much larger than Custodes, but these spreadsheets do not have the ground truth labeling. This evaluation was performed to observe the experience of an auditor using the neural network prediction function on a new unlabeled dataset to find the NWFE errors.

In addition to comparing the neural network prediction function to Custodes, the neural network prediction function was compared to a simple statistical classifier based on remembering every 5×5 context and predicting based on the frequency of outcomes in the training set. As with the neural network prediction function, this classifier was trained to detect instances where F is predicted but N is present with a threshold for prediction based on the ratio of observations where F was observed compared to how many times either F or N was observed. The simple statistical classifier was trained on the Excel training set described above. In that collection of spreadsheets, 3,553,482 different contexts were observed and recorded. Since this baseline approach can only predict specific contexts that it has observed, a comparison of the neural network prediction function may provide an understanding of how effective the neural network prediction function is at generalizing from raw data.

Furthermore, the neural network prediction function was compared to a second baseline in the form of a classifier based on Support Vector Machines (SVM). The spreadsheets are encoded to a fixed dimension 5×5 context vector for both the training sets and the vectors are then used to train the SVM model. The default SVM model from scikit free software machine learning library (available at https://github.com/scikit-learn/scikit-learn that uses the radial basis function (rbf) kernel was selected and trained with the contexts observed in the Excel training set. For a fair comparison with the neural network prediction function no additional features were provided to the encoding vector other than the abstraction of the cells in the 5×5 context.

For training the neural network prediction function, approximately 9.1 million vectors were selected from the Excel. The vectors were divided into 80% for training and the remaining 20% for validation. The neural network prediction function was trained for 50 epochs, where each epoch completes a forward and backward pass in the network for all the training vectors. The training batch size was 128, i.e. each forward/backward pass comprises 128 training examples. The neural network prediction function took from 18 hours to 76 hours to train, depending on the configuration. In some training runs, specifically for the larger 9×9 models, the computing machine ran out of memory before finishing 50 epochs. For such cases, the last saved epoch model was used for evaluation. The models were trained on a machine with a 2.8 GHz XEON CPU (available from Intel Corporation of Santa Clara, Calif.) with 64 GBs of RAM and a 12 GB TESLA K40m GPU (available from Nvidia of Santa Clara, Calif.). The keras deep learning library was used to implement the neural network prediction function, which underneath used the Theano deep learning framework.

The number of true and false positives reported by the various classifiers were consider in the experiment. In the low-error subset of the Custodes benchmark workbooks, there were 42,269 cells that contained numbers and 474 of those were labeled by hand as true NWFE errors. The Custodes found the most true positives (421/474) but also reported a large number of false positives (720). Without wishing to be bound by theory, it is believed that this result happens because Custodes is quite aggressive at growing clusters of related cells, to the point that in some cases it over-generalizes, resulting in more false positives.

All configurations of the neural network prediction model with N×N encodings significantly outperformed the classic and SVM baseline classifiers. The classic classifier baseline predicted only 50 true positives and 57 false positives. The SVM baseline predicted only 94 true positive and 781 false positives. The 5×5 encoded feed-forward neural network prediction function found 159 true positives with 240 false positives. In general, in these experiments, adding additional feed-forward layers did not seem to improve the model performance, as the best 5×5-FF4 model found 146 true positives with 215 false positives. The larger window size also does not add to the model performance, as the best 9×9-FF4 model found 129 true positives with 137 false positives. Using an LSTM layer instead of a feed-forward layer seems to have slightly degraded the performance in these experiments. Finally, the 9+9-FF4 model performed the worst, as it found a large number of false positives. This result shows the importance of having all the cells in the neighborhood window, as opposed to only the row and column cells.

As described earlier, in these experiments, the 5×5-FF1 neural network prediction function seemed to perform the best amongst all neural network prediction functions in the experiment with an F1 score of 0.365, Other N×N functions have F1 scores in the range of 0.32-0.35, which are all significantly higher than the baseline scores of 0.17 (classic baseline) and 0.14 (SVM). The Custodes system achieves an F1 score of 0.521. In conclusion, the 5×5 context encoded neural network prediction function trained with the Excel dataset performed the best amongst the different neural network configurations, detecting significantly fewer true errors than Custodes but also reporting significantly fewer false positives. The neural network prediction function predicts that less than 1% (0.68%) of cells contain errors and is correct about 40% of the time for the Custodes benchmarks.

In some implementations, the methods and processes described herein may be tied to a computing system of one or more computing devices. In particular, such methods and processes may be implemented as a computer-application program or service, an application-programming interface (API), a library, and/or other computer-program product.

Figure 9:
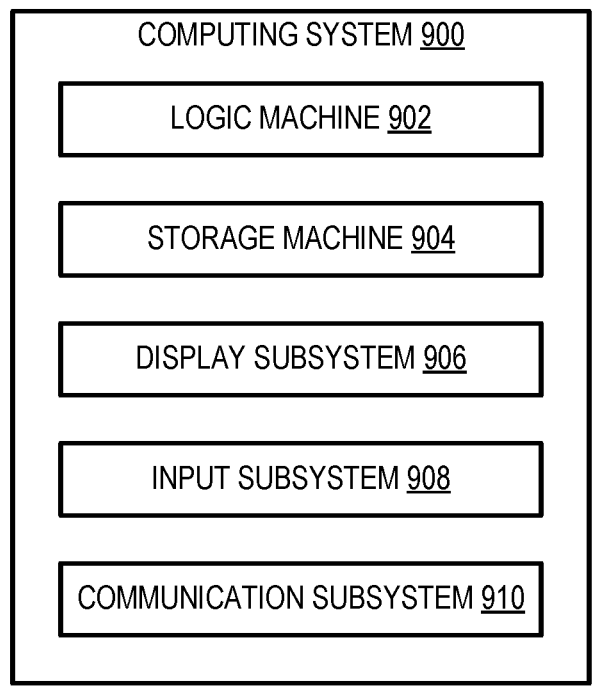
FIG. 9 shows an example computing system.

FIG. 9 schematically shows a non-limiting implementation of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices. For example, the computing system 900 may be representative of the user computing device 102, the spreadsheet analysis service computing system 128, and the organization data-storage system 124 of FIG. 1.

Computing system 900 includes a logic machine 902 and a storage machine 904. Computing system 900 may optionally include a display subsystem 906, input subsystem 908, communication subsystem 910, and/or other components not shown in FIG. 9.

Logic machine 902 includes one or more physical devices configured to execute instructions. For example, the logic machine 902 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 902 may include one or more processors configured to execute software instructions. Additionally or alternatively, the logic machine 902 may include one or more hardware or firmware logic machines configured to execute hardware or firmware instructions. Processors of the logic machine 902 may be single-core or multi-core, and the instructions executed thereon may be configured for sequential, parallel, and/or distributed processing. Individual components of the logic machine 902 optionally may be distributed among two or more separate devices, which may be remotely located and/or configured for coordinated processing. Aspects of the logic machine 902 may be virtualized and executed by remotely accessible, networked computing devices configured in a cloud-computing configuration.

Storage machine 904 includes one or more physical devices configured to hold instructions executable by the logic machine 902 to implement the methods and processes described herein. When such methods and processes are implemented, the state of storage machine 904 may be transformed—e.g., to hold different data.

Storage machine 904 may include removable and/or built-in devices. Storage machine 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 904 may include volatile, nonvolatile, dynamic, static, read/write, read-only, random-access, sequential-access, location-addressable, addressable, and/or content-addressable devices.

It will be appreciated that storage machine 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 902 and storage machine 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 900 implemented to perform a particular function. In some cases, a program may be instantiated via logic machine 902 executing instructions held by storage machine 904. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 906 may be used to present a visual representation of data held by storage machine 904. This visual representation may take the form of a graphical user interface (GUI). As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic machine 902 and/or storage machine 904 in a shared enclosure, or such display devices may be peripheral display devices.

When included, input subsystem 908 may comprise or interface with one or more user-input devices such as a keyboard, mouse, touch screen, or game controller. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared; color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem 910 may be configured for communication via a wireless telephone network, or a wired or wireless local- or wide-area network. In some implementations, the communication subsystem 910 may allow computing system 900 to send and/or receive messages to and/or from other devices via a network such as the Internet.

In another example, a device comprises a logic machine and a data-holding machine having instructions executable by the logic machine to receive a spreadsheet including a plurality of cells, apply an abstraction to the spreadsheet that defines one or more features of a cell set including one or more cells of the plurality of cells to form an abstracted representation of the spreadsheet, form, for the cell set, an input vector for a machine-learning prediction function from the abstracted representation of the spreadsheet. The machine-learning prediction function is configured to output a prediction of one or more properties of the cell set based on the input vector. The machine-learning prediction function is previously trained based on a plurality of previously-created spreadsheets. The instructions are further executable by the logic machine to provide the input vector to the machine-learning prediction function, and output the prediction from the machine-learning prediction function. In this example and/or other examples, the input vector may include a plurality of other cell sets selected from the spreadsheet based on the cell set. In this example and/or other examples, the machine-learning prediction function may be produced via training of a neural network model with the plurality of previously-created spreadsheets. In this example and/or other examples, the prediction of the one or more properties of the cell set may include a prediction of whether the cell set includes a potential error. In this example and/or other examples, the potential error may include the cell set having a type of content that differs from an expected type of content for the cell set. In this example and/or other examples, the abstraction may define a plurality of content classes, and applying the abstraction to the spreadsheet may include classifying the cell set as being a member of one or more content classes of the plurality of content classes based upon content of the cell set. In this example and/or other examples, the prediction may include a probability distribution that the content of the cell set corresponds to each content class of the plurality of content classes. In this example and/or other examples, the spreadsheet may include a plurality of sheets arranged in a workbook, and each sheet of the plurality of sheets may include a plurality of cells. In this example and/or other examples, the instructions may be further executable by the logic machine to identify a template used to create the spreadsheet, and select a template-specific abstraction and/or a template-specific machine-learning prediction function for the spreadsheet based on the identified template. In this example id/or other examples, the instructions may be further executable by the logic machine to identify an organization associated with the spreadsheet and select an organization-specific abstraction and/or an organization-specific machine-learning prediction function for the spreadsheet based on the identified organization. In this example and/or other examples, the instructions may be further executable by the logic machine to visually present, via a display, a visual representation indicating the prediction of the one or more properties of the cell set on the spreadsheet.

In another example, a method comprises receiving a spreadsheet including a plurality of cells, applying an abstraction to the spreadsheet that defines one or more features of a cell set including one or more cells of the plurality of cells to form an abstracted representation of the spreadsheet, forming, for the cell set, an input vector for a machine-learning prediction function from the abstracted representation of the spreadsheet. The machine-learning prediction function is configured to output a prediction of one or more properties of the cell set based on the input vector. The machine-learning prediction function is previously trained based on a plurality of previously-created spreadsheets. The method further comprises providing the input vector to the machine-learning prediction function, and outputting the prediction from the machine-learning prediction function. In this example and/or other examples, the method may further comprise visually presenting, via a display, a visual representation indicating the prediction of the one or more properties of the cell set on the spreadsheet. In this example and/or other examples, the input vector may include a plurality of other cell sets selected from the spreadsheet based on the cell set. In this example and/or other examples, the machine-learning prediction function may be produced via training of a neural network model with the plurality of previously-created spreadsheets. In this example and/or other examples, the prediction of the one or more properties of the cell set may include a prediction of whether the cell set includes a potential error. In this example and/or other examples, the abstraction may define a plurality of content classes, and applying the abstraction to the spreadsheet may include classifying the cell set as being a member of one or more content classes of the plurality of content classes based upon content of the cell set. In this example and/or other examples, the prediction may include a probability distribution that the content of the cell set corresponds to each content class of the plurality of content classes. In this example and/or other examples, the spreadsheet may include a plurality of sheets arranged in a workbook, and each sheet of the plurality of sheets may include a plurality of cells.

In another example, a device comprises a logic machine and a data-holding machine having instructions executable by the logic machine to receive a plurality of previously-created spreadsheets, each previously-created spreadsheet of the plurality of previously-created spreadsheets including a plurality of cell sets, each cell set of the plurality of cell sets including one or more cells, for each spreadsheet of the plurality of previously-created spreadsheets, apply an abstraction to the spreadsheet that defines one or more features of each cell set of the plurality of cell sets to form an abstracted representation of the spreadsheet, form a set of training vectors for a machine-learning model from the abstracted representation of each spreadsheet of the plurality of previously-created spreadsheets, each training vector of the set of training vectors being formed for a corresponding cell set. The machine-learning model is configured to produce a machine-learning prediction function based on the set of training vectors. The machine-learning prediction function is configured to receive an input vector for a cell set of a spreadsheet as input and output a prediction of one or more properties of the cell set based on the input vector. The instructions are further executable by the logic machine to train the machine-learning model with the set of training vectors to produce the machine-learning prediction function and output the machine-learning prediction function.

It will be understood that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A device comprising:
a logic machine including one or more processors; and
a data-holding machine having instructions executable by the logic machine to
receive a spreadsheet that is based on a template, the spreadsheet including a plurality of cells;
apply a selected template-specific abstraction to the spreadsheet, wherein the selected template-specific abstraction is selected from a plurality of template-specific abstractions for a corresponding plurality of templates for spreadsheets, and wherein the selected template-specific abstraction defines one or more features of a cell set including one or more cells of the plurality of cells to form an abstracted representation of the spreadsheet, wherein forming the abstracted representation of the spreadsheet comprises replacing content of each cell of the cell set with an abstraction of the content replaced based upon the selected template-specific abstraction, the abstraction of the content comprising one or more symbols that represent a feature of the content replaced;
form, for the cell set, an input vector for a machine-learning prediction function from the abstracted representation of the spreadsheet, the machine-learning prediction function configured to identify one or more patterns in the cell set and output a prediction of one or more properties of the cell set based on the input vector, wherein the machine-learning prediction function is previously trained based on a plurality of previously-created spreadsheets, and wherein the prediction of the one or more properties of the cell set includes a prediction of whether the cell set includes a potential error;
provide the input vector to the machine-learning prediction function; and
output the prediction from the machine-learning prediction function.

2. The device of claim 1, wherein the input vector includes a plurality of other cell sets selected from the spreadsheet based on the cell set.

3. The device of claim 1, wherein the machine-learning prediction function is produced via training of a neural network model with the plurality of previously-created spreadsheets.

4. The device of claim 1, wherein the potential error includes the cell set having a type of content that differs from an expected type of content for the cell set.

5. The device of claim 1, wherein the selected template-specific abstraction defines a plurality of content classes, and wherein applying the selected template-specific abstraction to the spreadsheet includes classifying the cell set as being a member of one or more content classes of the plurality of content classes based upon content of the cell set.

6. The device of claim 5, wherein the prediction includes a probability distribution that the content of the cell set corresponds to each content class of the plurality of content classes.

7. The device of claim 1, wherein the spreadsheet includes a plurality of sheets arranged in a workbook, and wherein each sheet of the plurality of sheets includes a plurality of cells.

8. The device of claim 1, wherein the instructions are further executable by the logic machine to:
identify the template used to create the spreadsheet; and
select a template-specific machine-learning prediction function for the spreadsheet based on the identified template.

9. The device of claim 1, wherein the instructions are further executable by the logic machine to:
identify an organization associated with the spreadsheet; and
select an organization-specific abstraction and/or an organization-specific machine-learning prediction function for the spreadsheet based on the identified organization.

10. The device of claim 1, wherein the instructions are further executable by the logic machine to:
visually present, via a display, a visual representation indicating the prediction of the one or more properties of the cell set on the spreadsheet.

11. A method comprising:
receiving a spreadsheet that is based on a template, the spreadsheet including a plurality of cells;
applying a selected template-specific abstraction to the spreadsheet, wherein the selected template-specific abstraction is selected from a plurality of template-specific abstractions for a corresponding plurality of templates for spreadsheets, and wherein the selected template-specific abstraction defines one or more features of a cell set including one or more cells of the plurality of cells to form an abstracted representation of the spreadsheet, wherein forming the abstracted representation of the spreadsheet comprises replacing content of each cell of the cell set with an abstraction of the content replaced based upon the selected template-specific abstraction, the abstraction of the content comprising one or more symbols that represent a feature of the content replaced;
forming, for the cell set, an input vector for a machine-learning prediction function from the abstracted representation of the spreadsheet, the machine-learning prediction function configured to output a prediction of one or more properties of the cell set based on the input vector, wherein the machine-learning prediction function is previously trained based on a plurality of previously-created spreadsheets;
providing the input vector to the machine-learning prediction function; and
outputting the prediction from the machine-learning prediction function.

12. The method of claim 11, further comprising:
visually presenting, via a display, a visual representation indicating the prediction of the one or more properties of the cell set on the spreadsheet.

13. The method of claim 11, wherein the input vector includes a plurality of other cell sets selected from the spreadsheet based on the cell set.

14. The method of claim 11, wherein the machine-learning prediction function is produced via training of a neural network model with the plurality of previously-created spreadsheets.

15. The method of claim 11, wherein the prediction of the one or more properties of the cell set includes a prediction of whether the cell set includes a potential error.

16. The method of claim 11, wherein the selected template-specific abstraction defines a plurality of content classes, and wherein applying the selected template-specific abstraction to the spreadsheet includes classifying the cell set as being a member of one or more content classes of the plurality of content classes based upon content of the cell set.

17. The method of claim 16, wherein the prediction includes a probability distribution that the content of the cell set corresponds to each content class of the plurality of content classes.

18. The method of claim 11, wherein the spreadsheet includes a plurality of sheets arranged in a workbook, and wherein each sheet of the plurality of sheets includes a plurality of cells.

19. A device comprising:
  a logic machine including one or more processors; and
  a data-holding machine having instructions executable by the logic machine to:
    receive a plurality of previously-created spreadsheets, each previously-created spreadsheet of the plurality of previously-created spreadsheets including a plurality of cell sets, each cell set of the plurality of cell sets including one or more cells;
    for the plurality of previously-created spreadsheets, select a selected template-specific abstraction from a plurality of template-specific abstractions for a corresponding plurality of templates for spreadsheets, wherein the selected template-specific abstraction relates to a structure and properties of the plurality of previously-created spreadsheets and wherein the selected template-specific abstraction defines one or more features of each cell set of the plurality of cell sets, and, for each spreadsheet of the plurality of previously-created spreadsheets, apply the selected template-specific abstraction to form an abstracted representation of the spreadsheet, wherein forming the abstracted representation of the spreadsheet comprises replacing content of each cell of each cell set with an abstraction of the content replaced based upon the selected template-specific abstraction, the abstraction of the content comprising one or more symbols that represent a feature of the content replaced;
    form a set of training vectors for a machine-learning model from the abstracted representation of each spreadsheet of the plurality of previously-created spreadsheets, each training vector of the set of training vectors being formed for a corresponding cell set, wherein the machine-learning model is configured to produce a machine-learning prediction function based on the set of training vectors, wherein the machine-learning prediction function is configured to receive an input vector for a cell set of a spreadsheet as input and output a prediction of one or more properties of the cell set based on the input vector;
    train the machine-learning model with the set of training vectors to produce the machine-learning prediction function; and
    output the machine-learning prediction function.

20. The device of claim 1, wherein the abstraction of the content comprises a symbol representing a content class.

* * * * *